US008803045B2

(12) United States Patent  (10) Patent No.: US 8,803,045 B2
Cadima  (45) Date of Patent: Aug. 12, 2014

(54) INDUCTIVELY COUPLED OVEN DIVIDER

(75) Inventor: Paul Bryan Cadima, Louisville, KY (US)

(73) Assignee: General Electric Company, Schenectady, NY (US)

( * ) Notice: Subject to any disclaimer, the term of this patent is extended or adjusted under 35 U.S.C. 154(b) by 29 days.

(21) Appl. No.: 13/343,124

(22) Filed: Jan. 4, 2012

(65) Prior Publication Data

US 2013/0168384 A1  Jul. 4, 2013

(51) Int. Cl.
*H05B 6/02* (2006.01)
*H05B 6/00* (2006.01)
*A21B 3/13* (2006.01)

(52) U.S. Cl.
USPC ............... 219/618; 219/600; 99/324; 99/451

(58) Field of Classification Search
USPC ......... 219/608, 620, 624, 626, 630, 660, 662, 219/665, 663, 385, 600–605, 618, 672; 165/64; 99/325, 451, 324; 126/19
See application file for complete search history.

(56) References Cited

U.S. PATENT DOCUMENTS

| 4,780,597 | A | | 10/1988 | Linhart et al. |
| 4,881,590 | A | * | 11/1989 | Meier ........................ 165/48.1 |
| 5,618,458 | A | | 4/1997 | Thomas |
| 5,628,241 | A | * | 5/1997 | Chavanaz et al. ............... 99/331 |
| 6,501,057 | B1 | * | 12/2002 | Jarvis ............................. 219/621 |
| 6,539,846 | B2 | * | 4/2003 | Citterio et al. .................. 99/468 |
| 6,545,251 | B2 | | 4/2003 | Allera et al. |
| 7,071,448 | B1 | | 7/2006 | Kim et al. |
| 7,183,520 | B2 | | 2/2007 | Park |
| 2010/0155391 | A1 | * | 6/2010 | Koschberg et al. ........... 219/672 |

FOREIGN PATENT DOCUMENTS

JP  57166426 A  * 10/1982  .............. F24C 15/00

OTHER PUBLICATIONS

Sato, Automatic Heating Cooker, Oct. 1982, translation of JP 57166426 A.*

* cited by examiner

*Primary Examiner* — Dana Ross
*Assistant Examiner* — Michael Laflame, Jr.
(74) *Attorney, Agent, or Firm* — Global Patent Operation; Douglas D. Zhang (57) ABSTRACT

A cavity divider is provided for use within an appliance cavity to partition the appliance cavity into a plurality of sub-cavities. The appliance cavity has a sending coil. The cavity divider comprises a pick-up coil and a heating element, whereby the sending coil is configured to be inductively coupled to the pick-up coil, whereby an electrical current generated in the pick-up coil provides power to the heating element.

18 Claims, 7 Drawing Sheets

FIG. 7

INDUCTIVELY COUPLED OVEN DIVIDER

BACKGROUND OF THE INVENTION

The subject matter disclosed herein relates to appliances, such as ovens, and more particularly, to oven inserts for use in appliances, such as ovens.

An oven is a thermally insulated chamber typically used to heat or dry a substance. Ovens are typically used for cooking. An oven typically comprises an oven cavity and one or more heating elements, such as a baking element and/or a broiling element, positioned within the oven cavity for heating food items positioned within the oven cavity.

A number of techniques have been proposed or suggested for improving the efficiency and/or flexibility of ovens by providing removable partitions for oven cavities such that the same oven may be configured to have a single oven cavity or multiple oven cavities. For example, U.S. Pat. Nos. 4,780,597, 5,618,458 and 7,071,448 disclose an oven cavity having at least one partition to divide the oven into multiple oven cavities. Generally, the partition converts a single large cavity oven into two oven cavities. An adjustable oven size provides the user with more flexibility to define the oven size.

While these adjustable ovens have improved the efficiency and/or versatility of ovens and other appliances, they suffer from a number of limitations, which if overcome, could further improve the utility of such adjustable ovens. For example, the partitions may incorporate a heating element that requires power. Thus, unsightly openings for connections would be required along the interior surface of the oven cavity where grease and moisture may migrate into the connections. In addition, the electrical connectors to the heating element often make it difficult to move the flexible partition.

A need therefore exists for improved techniques for providing power to a heating element within a movable partition for an oven cavity. A further need exists for an inductively coupled flexible oven divider.

BRIEF DESCRIPTION OF THE INVENTION

As described herein, the exemplary embodiments of the present invention overcome one or more disadvantages known in the art.

One aspect of the present invention relates to a cavity divider for use within an appliance cavity to partition the appliance cavity into a plurality of sub-cavities. The appliance cavity has a sending coil. The flexible cavity divider comprises a pick-up coil and a heating element, whereby the sending coil is configured to be inductively coupled to the pick-up coil, whereby an electrical current generated in the pick-up coil provides power to the heating element.

Another aspect of the present invention relates to a method for applying power to a cavity divider for use within an appliance cavity. The cavity divider comprises a pick-up coil and a heating element and partitions the appliance cavity into a plurality of sub-cavities. The appliance has a sending coil. The method comprises positioning the flexible cavity divider within the appliance cavity such that the sending coil is inductively coupled to the pick-up coil; and applying an electrical current to the sending coil to generate an electrical current in the pick-up coil and thereby provide power to the heating element.

Advantageously, illustrative embodiments of the present invention provide the ability to configure a single appliance cavity (e.g., an oven cavity) into one or more appliance cavities, and to provide heat to at least one cavity using inductive coupling.

These and other aspects and advantages of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and, unless otherwise indicated, they are merely intended to conceptually illustrate the structures and procedures described herein.

DETAILED DESCRIPTION OF THE EXEMPLARY EMBODIMENTS OF THE INVENTION

One or more illustrative embodiments of the invention will be described below in the context of an oven appliance. However, it is to be understood that embodiments of the invention are not intended to be limited to use with any particular appliance. Rather, embodiments of the invention may be applied to and deployed in any other suitable environment in which it would be desirable to configure a single appliance cavity (e.g., an oven cavity) into one or more appliance cavities, and to provide heat to at least one cavity using inductive coupling.

As illustratively used herein, the term "appliance" is intended to refer to a device or equipment designed to perform one or more specific functions. This may include, but is not limited to, equipment for consumer use, e.g., a wall-mounted oven, a freestanding oven, a microwave oven, etc. This may include, but is not limited to, any equipment that is useable in household or commercial environments.

Illustrative embodiments of the invention provide apparatus, systems and methods that provide the user with the ability to configure a single appliance cavity (e.g., an oven cavity) into one or more appliance cavities, and to provide heat to at least one cavity using inductive coupling. As will be evident in the illustrative embodiments described below, the disclosed inductively coupled moveable oven divider allows the user to configure a single appliance cavity into one or more appliance cavities.

The present invention provides an inductively coupled moveable oven divider for use in an oven or another heating appliance. According to one aspect of the invention, an oven divider assembly containing a heating element is inductively coupled with one or more sending coils such that a change in current flow through the one or more sending coils induces a voltage across the ends of the heating element within the oven divider assembly through electromagnetic induction. In this manner, the inductive coupling powers the heating element without the need for a connector array within the oven cavity. Among other benefits, there are no exposed connectors or wear-out issues of high-current contacts, and the oven has a neat interior appearance.

Figure 1:
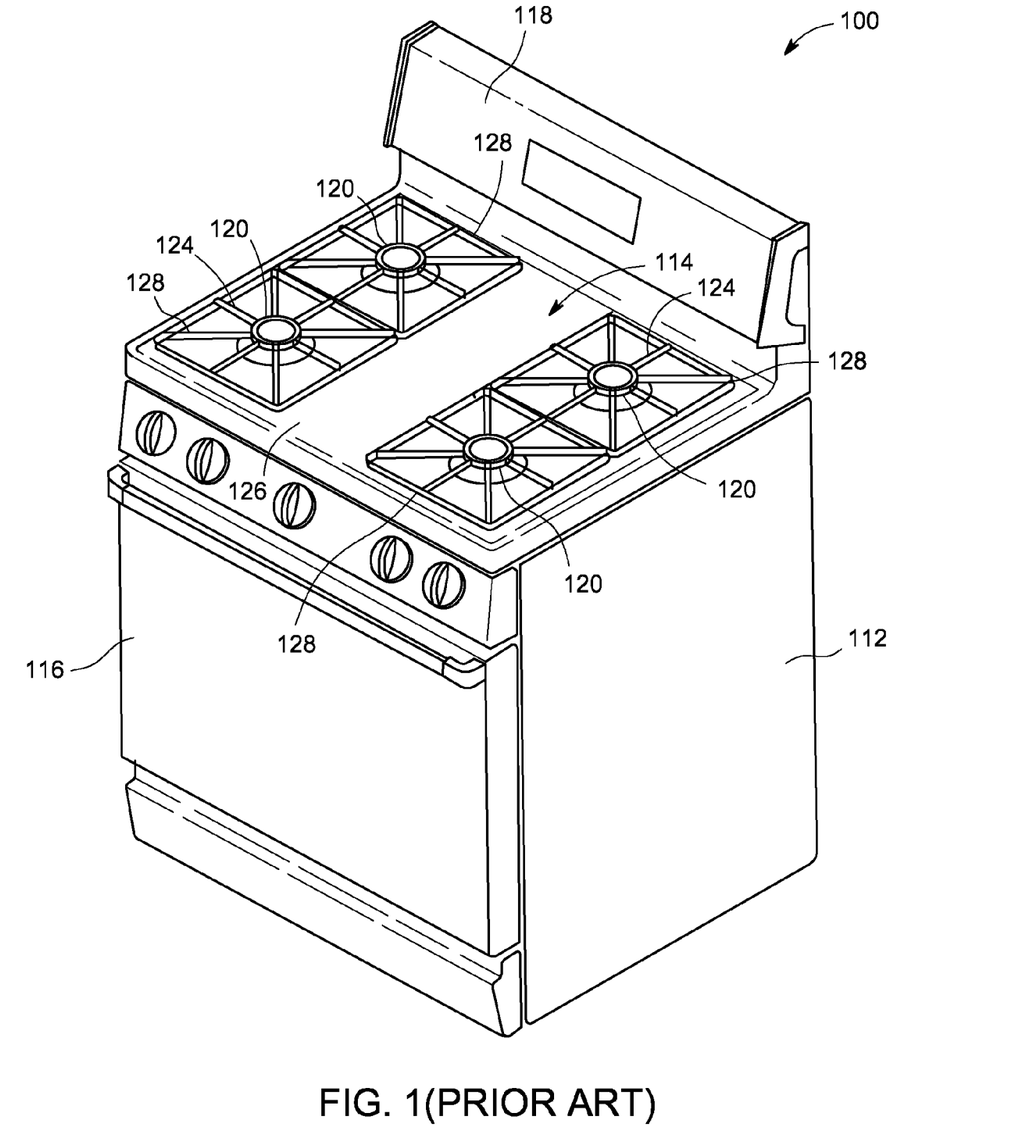
FIG. 1 illustrates a front perspective view of an exemplary conventional freestanding oven in which the herein described methods and apparatus may be practiced.
Figure 2:
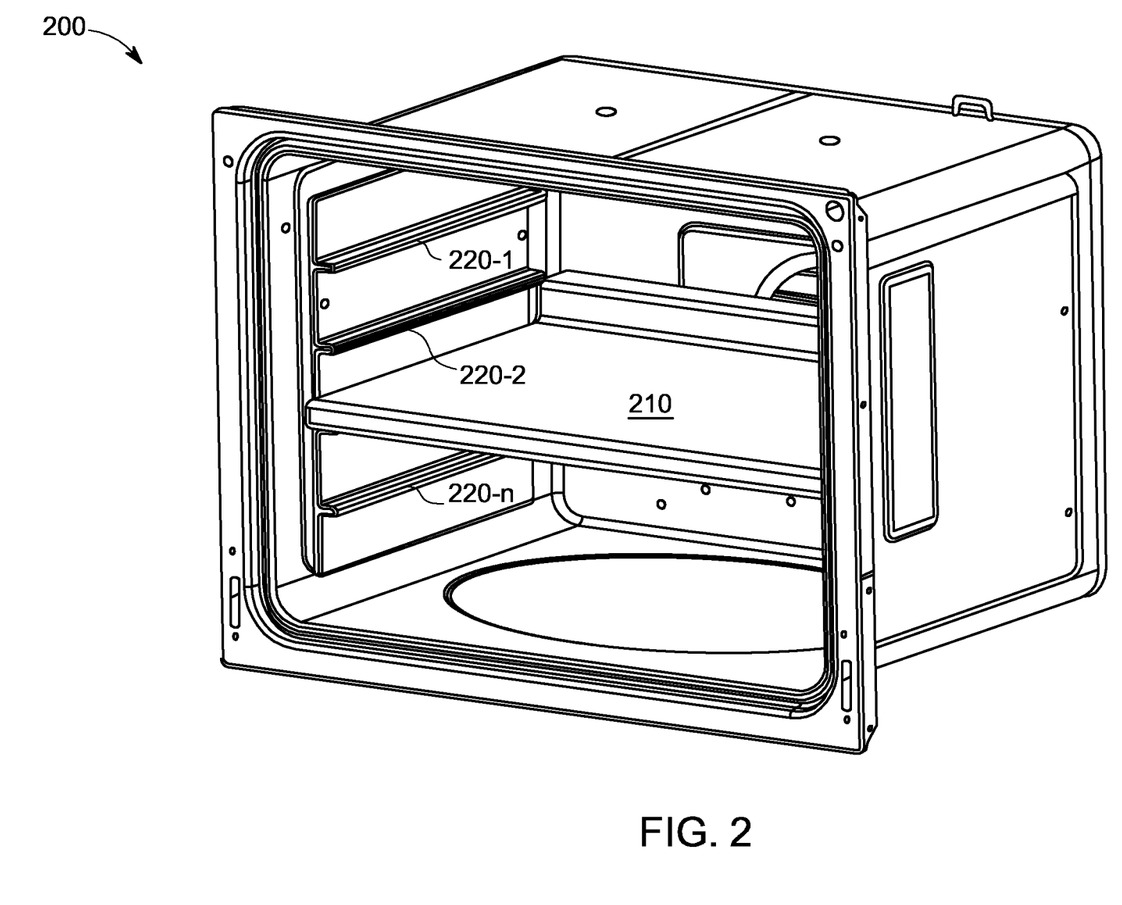
FIG. 2 illustrates a front perspective view of an exemplary oven cavity incorporating features of the present invention.
Figure 3:
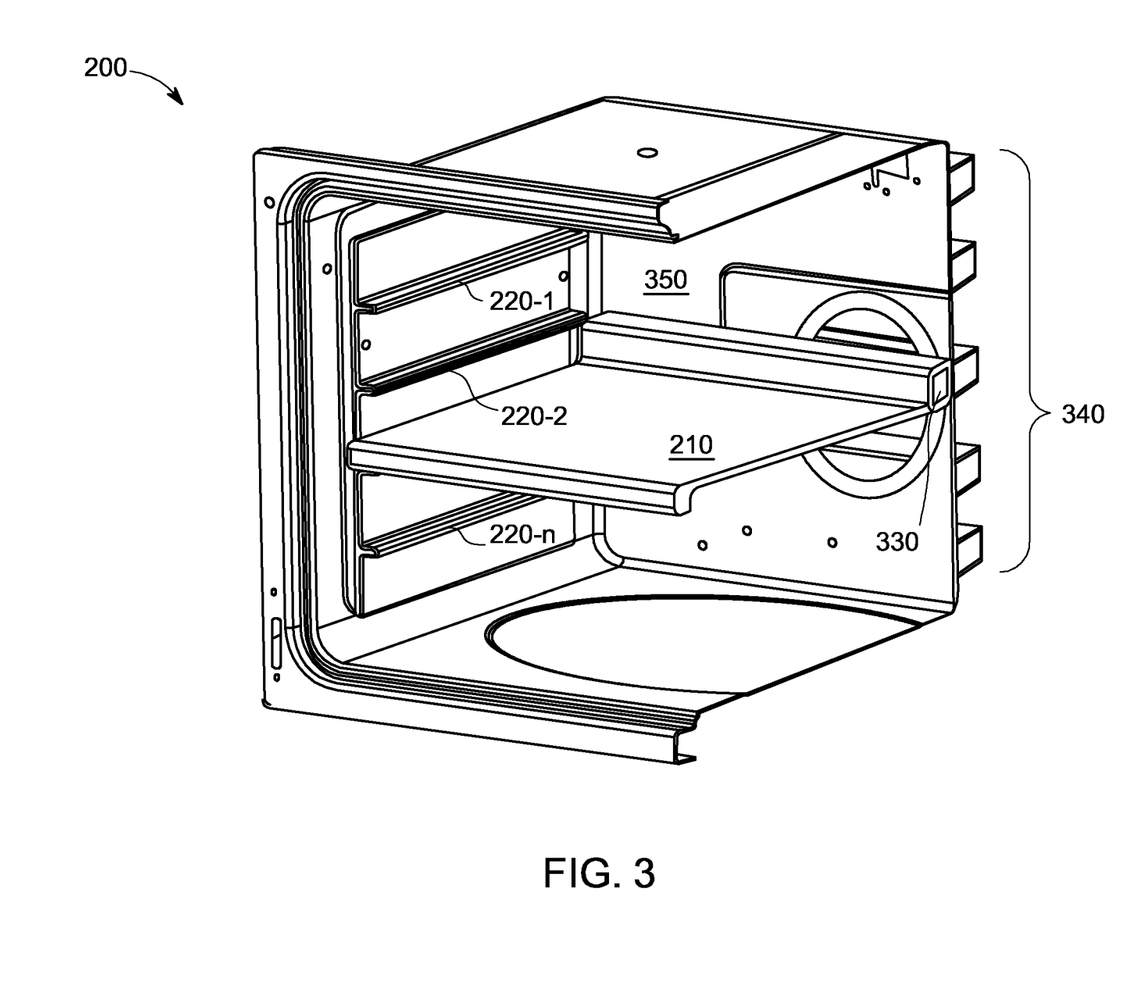
FIG. 3 illustrates a cut-away front perspective view of the exemplary oven cavity of FIG. 2.

FIG. 1 illustrates a front perspective view of an exemplary conventional freestanding range 100 in which the herein described methods and apparatus may be practiced. Range 100 includes an outer body or cabinet 112 that incorporates a generally rectangular cook top 114. An oven cavity, discussed further below, for example, in conjunction with FIGS. 2 and 3, is positioned below cook top 114 and has a front-opening access door 116. A range backsplash 118 extends upward of a rear edge of cook top 114 and contains various control selectors (not shown) for selecting operative features of heating elements for cook top 114 and the oven. It is contemplated that the herein described methods and apparatus are applicable, not only to freestanding ranges 100, but to other forms of ovens as well, such as, but not limited to, built-in ovens that are mounted in the wall. Therefore, range 100 is provided by way of illustration rather than limitation, and accordingly there is no intention to limit application of the herein described methods and apparatus to any particular appliance or oven, such as range 100.

Exemplary cook top 114 includes four gas fueled burner assemblies 120 which are positioned in spaced apart pairs positioned adjacent each side of cook top 114. Each pair of burner assemblies 120 is surrounded by a recessed area 124 of cook top 114. Recessed areas 124 are positioned below an upper surface 126 of cook top 114 and serve to catch any spills from cooking utensils (not shown in FIG. 1) being used with cook top 114. Each burner assembly 120 extends upwardly through an opening in recessed areas 124, and a grate 128 is positioned over each burner 120. Each grate 128 includes a flat surface thereon for supporting cooking vessels and utensils over burner assemblies 120 for cooking of meal preparations placed therein.

FIG. 2 illustrates a front perspective view of an exemplary oven cavity 200 incorporating features of the present invention. As shown in FIG. 2, the oven cavity 200 comprises a moveable oven divider 210 positioned on a support 220-1 through 220-n or other horizontal channels formed on the inside walls of the oven cavity 200 that hold the oven divider 210 in place at a given height.

The moveable oven divider 210 comprises at least one heating element 600 (not shown in FIG. 2), as discussed further below in conjunction with FIG. 6, and at least one pick-up coil. The moveable oven divider 210 is inserted into the interior of the oven cavity 200 in order to divide the single oven volume into two independent cavities. As shown in FIG. 2, there are optionally supports at different height positions to allow for more than one oven divider 210 to be in the oven at the same time, and/or for the one or more moveable oven dividers 210 to be repositioned in height.

The moveable oven divider 210 can optionally support food and/or cookware containing food inside the oven cavity 200 while the food cooks or is otherwise stored in the range 100. The moveable oven divider 210 defines an upper oven above the oven divider 210 and a lower oven below the oven divider 210. As discussed further below in conjunction with FIG. 6, the moveable oven divider 210 comprises a heating element (not shown in FIG. 2) to provide heat to one or more of the upper and lower ovens and optionally, a broil element for the lower cavity. The exemplary moveable oven dividers 210 are removable and adjustable in height.

The heating element is powered through inductive coupling with one or more sending coils, for example, mounted on the back wall of the oven cavity 200, as discussed further below in conjunction with FIG. 3. Thus, as discussed further below, one or more embodiments of the present invention transmit power through the back wall of the oven, using magnetic induction. In this manner, the inductive pick-up coil eliminates a need for connections in the oven cavity 200.

FIG. 3 illustrates a cut-away front perspective view of the exemplary oven cavity 200 of FIG. 2. As shown in FIG. 3, the exemplary oven cavity 200 comprises a moveable oven divider 210 positioned on a support 220-1 through 220-n, in a similar manner to FIG. 2. The exemplary oven cavity 200 also comprises an interior pick-up coil compartment 330 and an exterior sending coil array 340. Generally, as discussed further below in conjunction with FIGS. 6 and 7, a pick-up coil (not shown in FIG. 3) in the pick-up coil compartment 330 is inductively coupled to a pick-up coil in the sending coil array 340.

Thus, power is transmitted through the back wall 350 of the oven cavity 200 to the heating element (not shown in FIG. 3) within the moveable oven divider 210 using magnetic induction. The power to the heating element is induced through a magnetic field of one of the exterior sending coils in the sending coil array 340 which is picked up by the pick-up coil (not shown in FIG. 3) in the pick-up coil compartment 330. A controller (not shown) can determine the position of the flexible oven divider 210 and apply power to the appropriate exterior coil in the array 340 by pinging each exterior coil to detect the presence of the interior pick-up coil. A relay bank can switch the appropriate exterior sending coil on with an A/C signal, as would be apparent to a person of ordinary skill in the art. The interior pick-up coil then generates current induced by the magnetic field of the exterior power coil.

Figure 4:
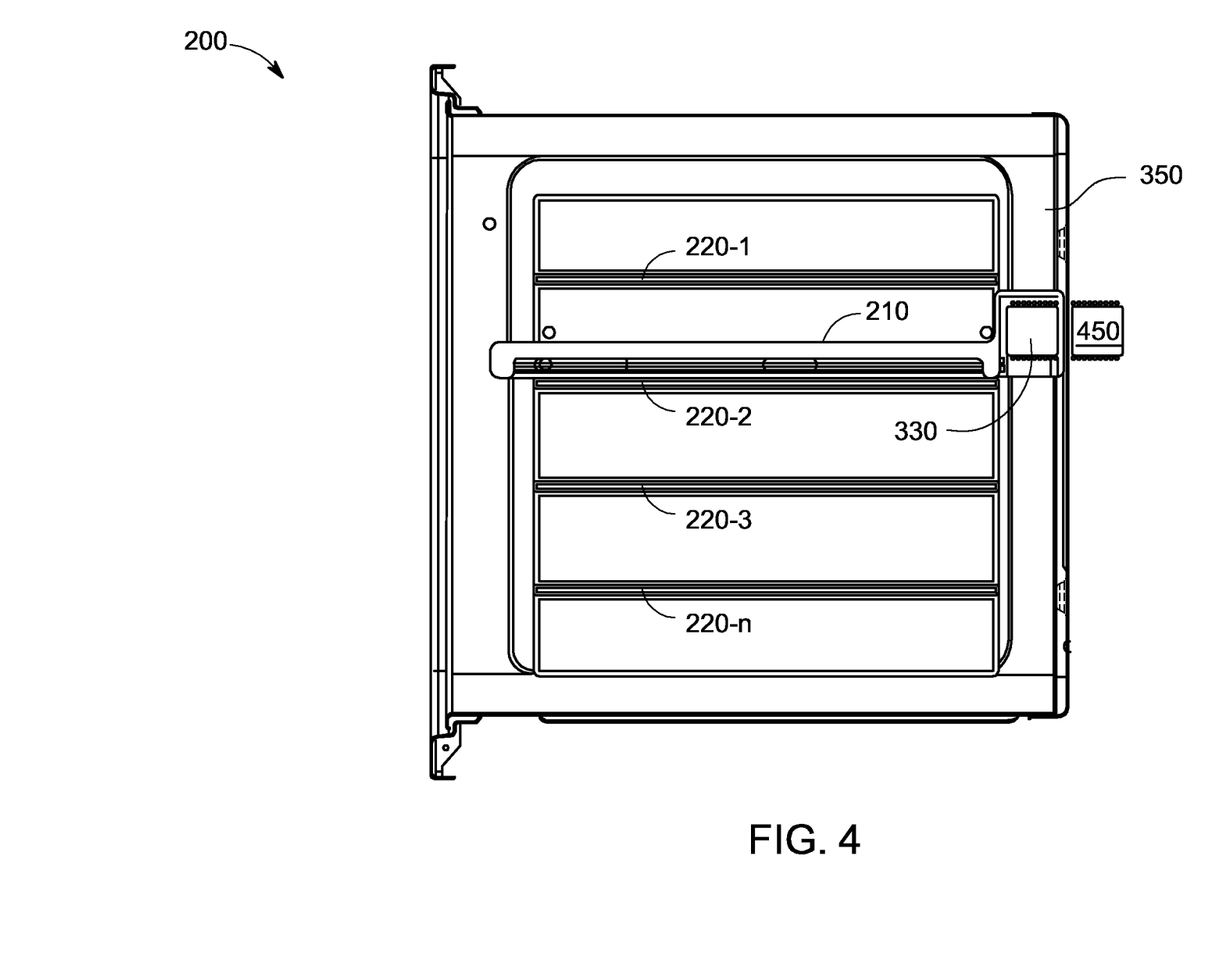
FIG. 4 illustrates a cut-away side view of the exemplary oven cavity of FIG. 2 having a single exterior sending coil.

FIG. 4 illustrates a cut-away side view of the exemplary oven cavity 200 of FIG. 2 having a single exterior pick-up coil 450. As shown in FIG. 4, the exemplary oven cavity 200 comprises a moveable oven divider 210 positioned on a support 220-1 through 220-n, in a similar manner to FIG. 2. The exemplary oven cavity 200 also comprises an interior pick-up coil compartment 330 and a single exterior sending coil 450. Generally, as discussed further below in conjunction with FIGS. 6 and 7, a pick-up coil (not shown in FIG. 4) in the pick-up coil compartment 330 is inductively coupled to the sending coil 450. Thus, power is transmitted through the back wall 350 of the oven cavity 200 to the heating element (not shown in FIG. 4) within the moveable oven divider 210 using magnetic induction.

In the exemplary embodiment of FIG. 4, the single sending coil 450 has a fixed position. Thus, the coupling between the pick-up coil in the moveable pick-up coil compartment 330 and the pick-up coil 450 is most efficient when the flexible oven divider 210 is in a close position to the pick-up coil 450, such as the position shown in FIG. 4.

The exterior side of the rear wall 350 of the oven cavity 200 is preferably non-ferrous, with one or more sending coils in an array 340 on the exterior. The non-ferrous real wall 350 may comprise, for example, a ceramic or aluminum alloy material and allows the coils' magnetic fields to penetrate the wall 350.

Figure 5:
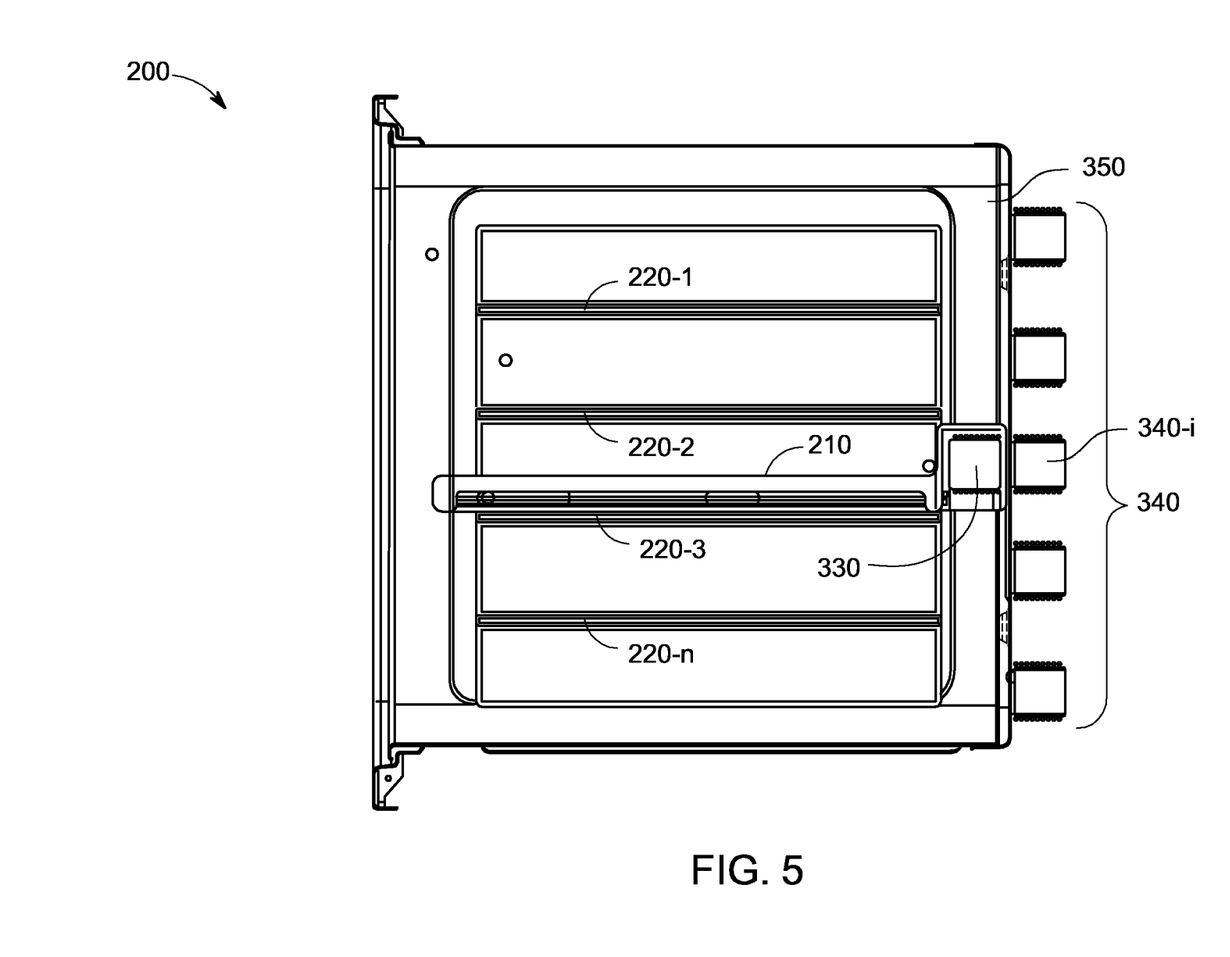
FIG. 5 illustrates a cut-away side view of the exemplary oven cavity of FIG. 2 having an array of exterior sending coils.

FIG. 5 illustrates a cut-away side view of the exemplary oven cavity 200 of FIG. 2 having an array 340 of exterior sending coils. As shown in FIG. 5, the exemplary oven cavity 200 comprises a moveable oven divider 210 positioned on a support 220-1 through 220-n, in a similar manner to FIG. 2. The exemplary oven cavity 200 also comprises a pick-up coil compartment 330.

An array 340 of exterior sending coils is mounted on the rear wall 350 of the oven cavity 200. As indicated above, a controller (not shown) can determine the position of the flexible oven divider 210 and apply power to the corresponding adjacent exterior coil 340-i in the array 340 by pinging each exterior coil to detect the position of the interior pick-up coil. The interior pick-up coil in the pick-up coil compartment 330 is inductively coupled to the adjacent exterior sending coil 340-i. Thus, power is transmitted through the back wall 350 of the oven cavity 200 to the heating element (not shown in FIG. 5) within the moveable oven divider 210 using magnetic induction.

Figure 6:
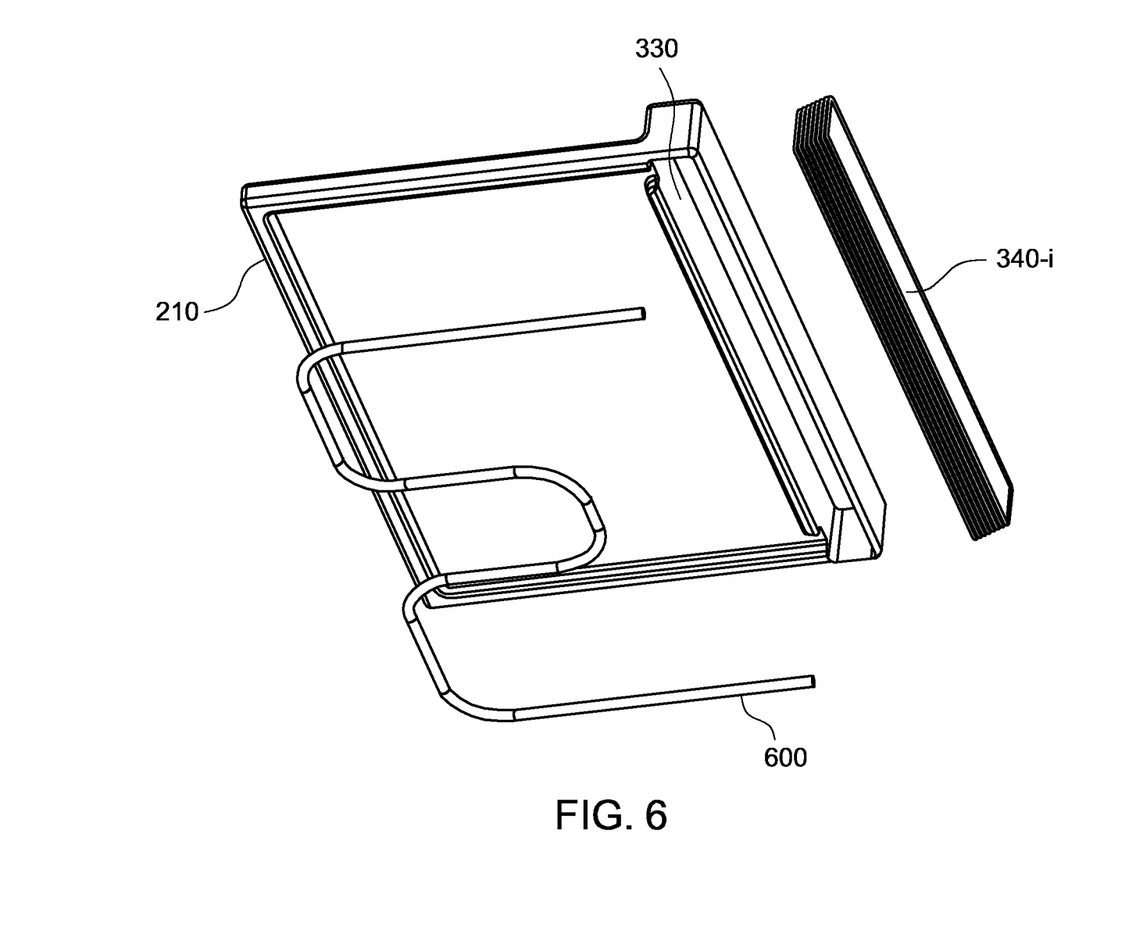
FIG. 6 illustrates an exploded view of the various components associated with the oven divider of FIG. 2 in further detail, as well as a pick-up coil.

FIG. 6 illustrates the various components associated with the moveable oven divider 210 of FIG. 2 in further detail, as well as an exterior, sending coil 340-i. As shown in FIG. 6, the exemplary moveable oven divider 210 comprises an interior, pick-up coil compartment 330, and a heating element 600. An interior, pick-up coil (not shown in FIG. 6) in the pick-up coil compartment 330 is inductively coupled to the exterior, sending coil 340-i. Thus, power is transmitted to the heating element 600 within the moveable oven divider 210 using magnetic induction. The power to the heating element is induced through a magnetic field of the exterior sending coil 340-i which is picked up by the interior pick-up coil in the pick-up coil compartment 330.

The heating element 600 may be implemented, for example, using the tubular heating elements commercially available from Zoppas Industries (http://www.ricaheatingelements.com/products/tubular-heaters); or those described in Aurel Raduta et al., "Optimal Design of Heating Elements Sheathed with INCOLOY Superalloy 800," WSEAS Trans. on Applied and Theoretical Mechanics (July 2010); or Marshall Brain, "How Coffee Makers Work" (http://home.howstuffworks.com/coffee-maker2.htm), each incorporated by reference herein.

In the embodiment of FIG. 6, the heating element 600 of FIG. 6 is implemented as a baking element. In a further variation, the heating element 600 can be replaced by or supplemented with a broiling element. Typically, broiling elements require greater power than baking elements. Thus, the interior and exterior pick-up coils would be larger, as would be apparent to a person of ordinary skill in the art.

Figure 7:
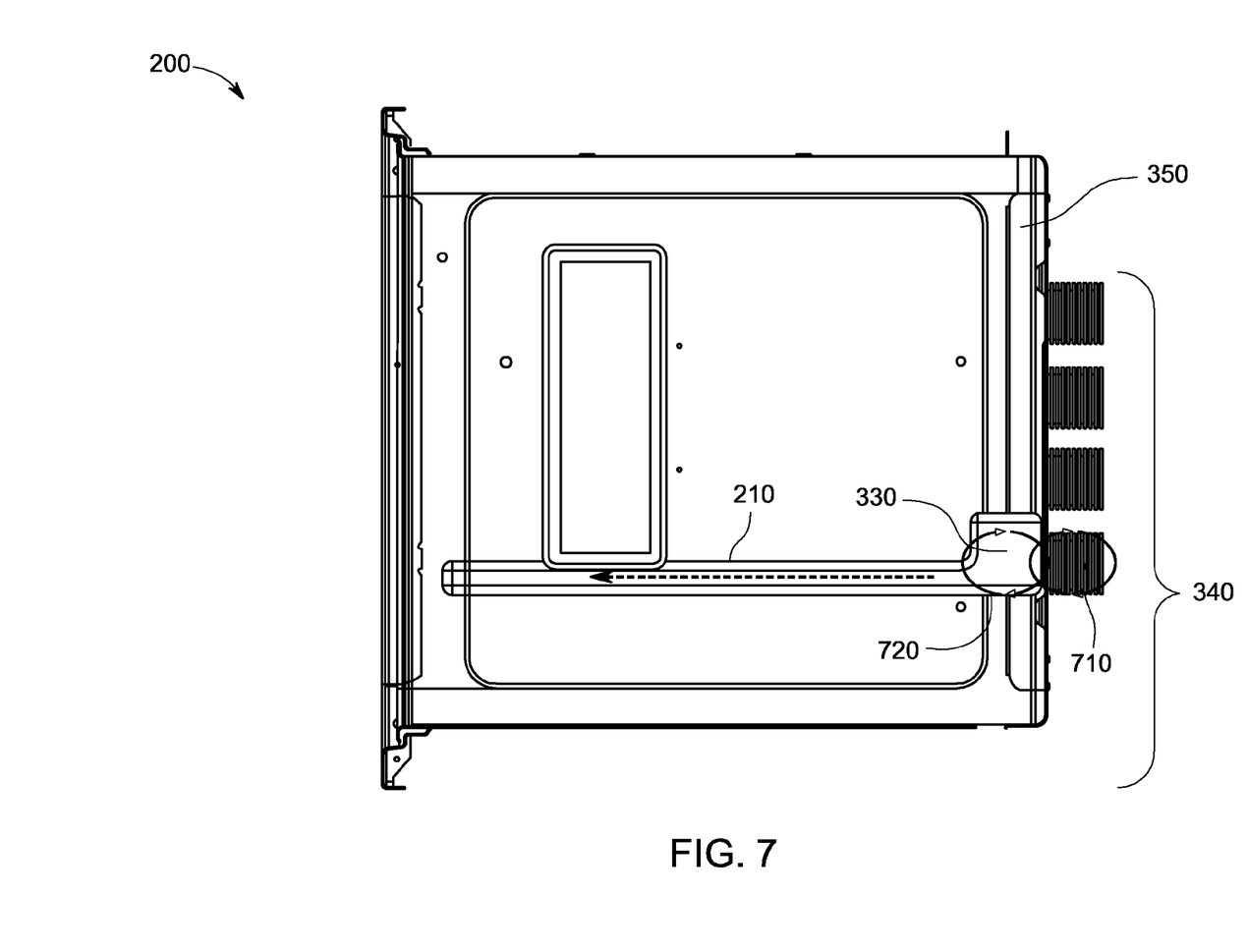
FIG. 7 illustrates a cut-away side view of the exemplary oven cavity of FIG. 2 having an array of exterior sending coils, in a similar manner to FIG. 5.

FIG. 7 illustrates a cut-away side view of the exemplary oven cavity 200 of FIG. 2 having an array 340 of exterior pick-up coils, in a similar manner to FIG. 5. As shown in FIG. 7, the exemplary oven cavity 200 comprises a moveable oven divider 210 and a pick-up coil compartment 330. The array 340 of exterior pick-up coils is mounted on the rear wall 350 of the oven cavity 200.

As indicated above, the interior pick-up coil in the pick-up coil compartment 330 is inductively coupled to the adjacent exterior pick-up coil 340-i. As shown in FIG. 7, the power to the heating element is induced through a magnetic field 710 of the exterior pick-up coil 340-i which is picked up by as a magnetic field 720 of the interior pick-up coil. Thus, power is transmitted through the back wall 350 of the oven cavity 200 to the heating element (not shown in FIG. 7) within the moveable oven divider 210 using magnetic induction. The amount of inductive coupling between the two conducting pick-up coils is measured by their mutual inductance, in a known manner. The coupling between two pick-up coils can be increased or decreased, as needed, using known techniques well understood to persons of ordinary skill in the art.

Thus, while there have been shown and described and pointed out fundamental novel features of the invention as applied to exemplary embodiments thereof, it will be understood that various omissions and substitutions and changes in the form and details of the devices illustrated, and in their operation, may be made by those skilled in the art without departing from the spirit of the invention. Moreover, it is expressly intended that all combinations of those elements and/or method steps which perform substantially the same function in substantially the same way to achieve the same results are within the scope of the invention. Furthermore, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus comprising:
a cavity having a back wall;
a cavity divider positioned inside said cavity to partition said cavity into a plurality of sub-cavities, said cavity divider comprising a pick-up coil and a heating element; and
a sending coil mounted on said back wall outside said cavity, wherein said sending coil is configured to be inductively coupled to said pick-up coil whereby an electrical current generated in said pick-up coil provides power to said heating element,
wherein said heating element of said cavity divider is configured to heat a first one of said sub-cavities and an additional heating element separate from said heating element of said cavity divider is configured to heat a second one of said sub-cavities, an amount of heat generated by said heating element of said cavity divider and an amount of heat generated by said additional heating element being independently controlled.

2. The apparatus of claim 1, further comprising a plurality of said sending coils.

3. The apparatus of claim 2, further comprising a controller to determine a position of said cavity divider and apply power to an appropriate one of said sending coils.

4. The apparatus of claim 2, further comprising a relay bank to apply an A/C signal to an appropriate one of said sending coils.

5. The apparatus of claim 1, wherein said cavity further comprises at least one support to hold said cavity divider at a given height.

6. The apparatus of claim 1, wherein a change in current flow through said pick-up coil induces a voltage across ends of said heating element.

7. The apparatus of claim 1, wherein said cavity divider provides heat to one or more of said plurality of sub-cavities.

8. The apparatus of claim 1, wherein said cavity divider is removable.

9. The apparatus of claim 1, wherein said cavity divider is adjustable in height.

10. A cavity divider for use within an appliance cavity to partition said appliance cavity into a plurality of sub-cavities, said appliance having a sending coil, said cavity divider comprising:
a pick-up coil and a heating element, whereby said sending coil is mounted on a back wall of said appliance cavity outside said appliance cavity and is configured to be inductively coupled to said pick-up coil inside said appliance cavity, whereby an electrical current generated in said pick-up coil provides power to said heating element, wherein said heating element of said cavity divider is configured to heat a first one of said sub-cavities and an additional heating element separate from said heating element of said cavity divider is configured to heat a second one of said sub-cavities, an amount of heat generated by said heating element of said cavity divider and an amount of heat generated by said additional heating element being independently controlled.

11. The cavity divider of claim 10, wherein a change in current flow through said pick-up coil induces a voltage across ends of said heating element.

12. The cavity divider of claim 10, wherein said cavity divider provides heat to one or more of said plurality of sub-cavities.

13. The cavity divider of claim 10, wherein said cavity divider is one or more of removable and adjustable in height.

14. A method for applying power to a cavity divider for use within an appliance cavity, wherein said cavity divider comprises a pick-up coil and a heating element and partitions said appliance cavity into a plurality of sub-cavities and wherein said appliance has a sending coil, said method comprising:

positioning said cavity divider within said appliance cavity such that said sending coil is inductively coupled to said pick-up coil, wherein said sending coil is mounted on a back wall of said appliance cavity outside said appliance cavity; and applying an electrical current to said sending coil to generate an electrical current in said pick-up coil to provide power to said heating element, wherein said heating element of said cavity divider being configured to heat a first one of said sub-cavities and an additional heating element separate from said heating element of said cavity divider being configured to heat a second one of said sub-cavities, an amount of heat generated by said heating element of said cavity divider and an amount of heat generated by said additional heating element being independently controlled.

15. The method of claim 14, further comprising the step of determining a position of said cavity divider to apply said electrical current to an appropriate one of a plurality of said sending coils.

16. The method of claim 14, wherein a change in current flow through said pick-up coil induces a voltage across ends of said heating element.

17. The method of claim 14, wherein said cavity divider provides heat to one or more of said plurality of sub-cavities.

18. The method of claim 14, further comprising the step of adjusting a position of said cavity divider.

* * * * *